(12) United States Patent
Kawamura

(10) Patent No.: US 9,032,417 B2
(45) Date of Patent: May 12, 2015

(54) INFORMATION PROCESSING APPARATUS AND INFORMATION PROCESSING APPARATUS CONTROL METHOD

(75) Inventor: Takaaki Kawamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 13/210,586

(22) Filed: Aug. 16, 2011

(65) Prior Publication Data

US 2012/0072920 A1    Mar. 22, 2012

(30) Foreign Application Priority Data

Sep. 17, 2010    (JP) .................................. 2010-208958

(51) Int. Cl.
*G06F 9/46* (2006.01)
*G06F 9/30* (2006.01)
*G06F 9/38* (2006.01)

(52) U.S. Cl.
CPC .......... *G06F 9/30123* (2013.01); *G06F 9/3851* (2013.01); *G06F 9/462* (2013.01)

(58) Field of Classification Search
None
See application file for complete search history.

(56) References Cited

U.S. PATENT DOCUMENTS

| | | | |
|---|---|---|---|
| 5,414,864 A | 5/1995 | Koizumi | |
| 5,937,192 A * | 8/1999 | Martin | 717/145 |
| 7,418,705 B2 | 8/2008 | Kanai et al. | |
| 2004/0055003 A1 | 3/2004 | Sundaram et al. | |
| 2005/0138338 A1 * | 6/2005 | Sodani et al. | 712/225 |
| 2008/0270771 A1 * | 10/2008 | Lee et al. | 712/228 |

FOREIGN PATENT DOCUMENTS

| | | |
|---|---|---|
| JP | 02-146631 | 6/1990 |
| JP | 05-127926 | 5/1993 |
| JP | 05-165652 | 7/1993 |
| JP | 2001-297007 | 10/2001 |
| JP | 2005-18610 | 1/2005 |

OTHER PUBLICATIONS

Deterministic Context Switching of Registers, IBM, Nov. 1, 1989.*
Fujitsu Limited, "SPARC64TM VIIIfx Extensions" Ver.15, [online], [search on Apr. 26, 2010], Internet <URL:http://img.jp.fujitsu.com/downloads/jp/jphc/sparc64viiifx-extensions.pdf>.

(Continued)

*Primary Examiner* — Emerson Puente
*Assistant Examiner* — Sisley Kim
(74) *Attorney, Agent, or Firm* — Stass & Halsey LLP

(57) ABSTRACT

A information processing apparatus having a processor is controlled to execute a procedure of reading from the memory attribute information indicating a usage frequency of a register used by a process to be executed as a next process by the processor when the processor switches a process currently being executed, saving a value of the register used by the next process to be executed by the processor to the memory when the usage frequency of the register indicated by the attribute information is larger than a certain frequency, reading from the memory owner information indicating a process using the register to be used by the next process when the usage frequency of the register indicated by the attribute information is larger than the certain frequency, and restoring a register value saved in the memory to the register when the owner information indicates a process other than the next process.

12 Claims, 8 Drawing Sheets

(56) References Cited

OTHER PUBLICATIONS

Intel, "Intel(R) 64 and IA-32 Architectures Software Developer's Manual vol. 3A; System Programming Guide, Part 1", [online], [search on May, 2011], Internet <URL:http://www.intel.com/Assets/PDF/manual/253668.pdf>.

LXR community, "the Linux Cross Reference", [online], [search on Dec. 2, 2009], Internet <URL:http://lxr.linux.no/@linux+v2.6.32/include/linux/sched.h@L1249>.

Daniel P. Bovet, Marco Cesati, Understanding the Linux Kernel 3rd Edition, O'Reilly Japan, Februally 22, 2007; Chapter3.3s (pp. 110-123) (7 pages) (17 pages of English Translation).

Extended European Search Report issued Jul. 24, 2012 in corresponding European Patent Application No. 11179600.9 (6 pages).

"Deterministic Context Switching of Registers" US, IBM Technical Disclosure Bulletin, International Business Machines Corp. US, Nov. 1, 1989 vol. 32, No. 6B, pp. 70-73, ISSN: 0018-8689.

Japanese Office Action dated Apr. 1, 2014 in corresponding Japanese Patent Application No. 2010-208958 (4 pages) (2 pages English Translation).

* cited by examiner

FIG. 2

| BIT | USE | MEANING OF VALUE |
|---|---|---|
| 32 | INDICATES FPU AVAILABILITY/ UNAVAILABILITY | 0: FPU UNAVAILABLE<br>1: FPU AVAILABLE |
| <ABBREVIATED> | RESERVED REGION | ALWAYS 0 |
| 7 | %f56 - %f63 USAGE CONDITION | 0: NO REGISTERS IN USE<br>1: SOME OR ALL REGISTERS IN USE |
| 6 | %f48 - %f55 USAGE CONDITION | |
| 5 | %f40 - %f47 USAGE CONDITION | |
| 4 | %f32 - %f39 USAGE CONDITION | |
| 3 | %f24 - %f31 USAGE CONDITION | |
| 2 | %f16 - %f23 USAGE CONDITION | |
| 1 | %f8 - %f15 USAGE CONDITION | |
| 0 | %f0 - %f7 USAGE CONDITION | |

FIG. 3

| MEMBER NAME | USE |
|---|---|
| PROGRAM_CLASS | PROCESS TYPE MEMORY REGION<br>0: LAZY PROCESS<br>1: UNLAZY PROCESS<br>OTHER: OPERATES AS LAZY PROCESS |
| FPREGS | POINTER TO FP REGISTER SAVE REGION |

FIG. 4

| MEMBER NAME | USE |
|---|---|
| FP_OWNER | CURRENT FPOWNER OF APPLICABLE CORE |

INFORMATION PROCESSING APPARATUS AND INFORMATION PROCESSING APPARATUS CONTROL METHOD

CROSS-REFERENCE TO RELATED APPLICATIONS

This application is based upon and claims priority to prior Japanese Patent Application No. 2010-208958 filed on Sep. 17, 2010 in the Japan Patent Office, the entire contents of which are incorporated herein by reference.

FIELD

An embodiment of the present invention relates to an information processing apparatus, an information processing apparatus control method and a non-transitory computer-readable media storing an information processing apparatus control program.

BACKGROUND

Recent operating systems (OS) are equipped with a multiprocessing function that executes multiple processes in parallel on one computer. Typical multiprocessing functions allocate information processor resources to certain processes according to time divisions.

Hence, processes having information processor resources allocated by the operating system have right of use of the allocated information processor resources and behave as if possessing one information processor. To allow this process behavior, the operating system saves context information (such as address conversion information included in a page table used by registers, kernel stacks, and translation lookaside buffers (TLB)) unique to the process that will have the right of use of the information processor resources forfeited, to a kernel memory region. Then, the operating system provides a function (herein referred to as "context switch") to restore the context information of the process that obtains the right of use to hardware resources.

Recently, a central processing unit (CPU) adds registers and extends instruction sets to efficiently operate the added registers as an approach to improve computing capability. As a result, context size information saved by the process is increased which tends to increase costs such as operating system overhead due to context switching.

To address this problem, recent operating systems have adopted an approach (approach based on StateOwner function) of intentionally avoiding saving registers that do not need saving during a context switch and then saving such registers only when saving is needed after the context switch.

Moreover, since modifying a CPU incurs more costs compared to modifying software, there is a system to reduce the costs of context switches by modifying only the software. In this system, a counter that counts the occurrences of context switches is provided so that when the count exceeds a threshold embedded in the kernel, the context switch system is changed. After the counter wraps around and returns to the default value, the context switch system is restored again, and if the threshold is exceeded the context switch system is changed once more.

The StateOwner function seeks to reduce costs due to context switches by delaying the unnecessary saving of registers. If the program process attempts to access the information of processing apparatus resources for which the saving has been delayed, the OS actually executes the saving process. The CPU is a component that can detect a process accessing a resource subjected to delayed saving. The CPU that detects an access by a process generates an exception by interrupting the OS. An OS interrupted by the CPU terminates the process currently being executed and conducts a saving process for the delayed context information.

This type of OS exception processing has a problem in that, in addition to inviting interruption of process executions, the register saving processing is conducted to execute the exception process in the kernel, thus reducing the throughput of programs executed by the CPU. Therefore, processes frequently using resources that are subject to StateOwner functions lead to the problem of reduced performance of the entire system due to frequent exception occurrences.

A high performance computing job executed by a parallel computer is a program with a property of wanting to ensure a long CPU occupancy time within a certain time period even at the expense of sacrificing responsiveness. Therefore, frequent OS exception processing due to CPU exceptions reduces job throughput and causes a reduction in performance as a parallel computer.

A StateOwner function realized by conventional technology prepares a dedicated register that records the StateOwner in the CPU and the operating system administers this StateOwner dedicated register. As a result, a problem arises due to the complexity of the CPU circuit design and increased manufacturing costs.

From the standpoint only of job execution, there is a need to suppress the occurrence of CPU exceptions as described above. As a result, all context information should be saved when context switching occurs. However, programs focusing on responsiveness are also executed at the same time in recent parallel computers. When a system that saves the entire context when a context switch occurs is adopted, there is a problem that the process time needed for the context switches increases and program responsiveness is lost.

A method of changing context switch systems while programs are running causes a problem for incurring overhead with programs that determine the optimal context switch system before executing programs in the same way as jobs, and for incurring excessive loads with systems that monitor thresholds of counters that count the occurrences of context switches, since the changing of context switch systems frequently occurs while programs are running.

The present invention provides a program that executes a context switch system according to program types.

The following documents are prior art related to an information processing apparatus, and a method and program for controlling the information processing apparatus:

Japanese Unexamined Patent Application Publication No. 2005-18610.

Japanese Unexamined Patent Application Publication No. 2-146631.

Daniel P. Bovet, Marco Cesati, "Detailed Linux Kernels, Vers. 3", O'Reilly-Japan, Feb. 22, 2007, Chapter 3.3.

Fujitsu Limited, "SPARC64™ VIIIfx Extensions" Ver. 15, Apr. 26, 2010, Internet<URL: http://img.jp.fujitsu.com/downloads/jp/jhpc/sparc64viiifx-extensions.pdf>.

Intel, "Intel(R) 64 and IA-32 Architectures Software Developer's Manual Volume 3A; System Programming Guide, Part 1," May 2011, Internet<URL: http://www.intel.com/Assets/PDF/manual/253668.pdf>.

LXR community, "the Linux Cross Reference", Dec. 2, 2009, Internet<URL: http://lxr.linux.no/#linux+v2.6.32/include/linux/sched.h#L1249>.

SUMMARY

According to an aspect of an invention, an information processing apparatus having a processor is controlled to execute a procedure of reading from the memory attribute information indicating a usage frequency of a register used by a process to be executed as a next process by the processor when the processor switches a process currently being executed, saving a value of the register used by the next process to be executed by the processor to the memory when the usage frequency of the register indicated by the attribute information is larger than a certain frequency, reading from the memory owner information indicating a process using the register to be used by the next process when the usage frequency of the register indicated by the attribute information is larger than the certain frequency, and restoring a register value saved in the memory to the register when the owner information indicates a process other than the next process.

It is to be understood that both the foregoing general description and the following detailed description are exemplary and explanatory and are not restrictive of the invention, as claimed.

BRIEF DESCRIPTION OF DRAWINGS

FIG. 2 illustrates an FP state register format;

FIG. 3 illustrates a process administration information storage region format;

FIG. 4 illustrates an FPowner memory region format;

DESCRIPTION OF EMBODIMENT

An embodiment will be described herein with reference to the accompanying drawings. An embodiment describes a parallel computer applicable to the present invention with cluster-connected computing nodes operated by a general use operating system (for example, LINUX).

User jobs that conduct scientific and technical calculations, and commands for conducting files manipulations and the like operate in parallel in computing nodes. User jobs are expected to minimize intervention from the operating system and lengthen the CPU allocation time for the job to allow the computing to be completed in a short time. On the other hand, commands are important for the responsiveness of commands including I/O processing and for quickly returning processing results to the user even outside of CPU times.

In this embodiment, user jobs are defined as processes that frequently use floating point registers in the CPU. Commands, for example, are defined as processes that infrequently use floating point registers in the CPU.

The embodiment herein describes an example of a context switch of resources subjected to a StateOwner function by a process applicable to a floating point register cluster in the CPU. In the following description, a StateOwner function is represented as an FPowner function combined with floating point registers that are resources used in the present embodiment. A device unavailable exception for a Floating Point Unit (FPU) is represented as an FPU unavailable exception.

Furthermore, a process that never uses or almost never uses a floating point register is called a "lazy process," and a process that often uses a floating point register is called an "unlazy process". For example, a process of a program algorithm that frequently conducts floating point processing based on a source code may be defined as an unlazy process, and a process of a program algorithm that never or only locally uses floating point processing may be defined as a lazy process.

For example, a process with a frequency of floating point register usage above a threshold may be defined as an unlazy process, and a process with a frequency of floating point register usage equal to or below a threshold may be defined as a lazy process.

Usage frequency may be defined, for example, as the frequency of reading from and writing into a floating point register within a certain period of time. The usage frequency may be, for example, measured by operating actual processes and monitoring access to the floating point registers.

In the embodiment described below, a process for high performance computing that frequently uses floating point processing is activated as an unlazy process, and a normal process such as a command or daemon is activated as a lazy process.

Figure 1:
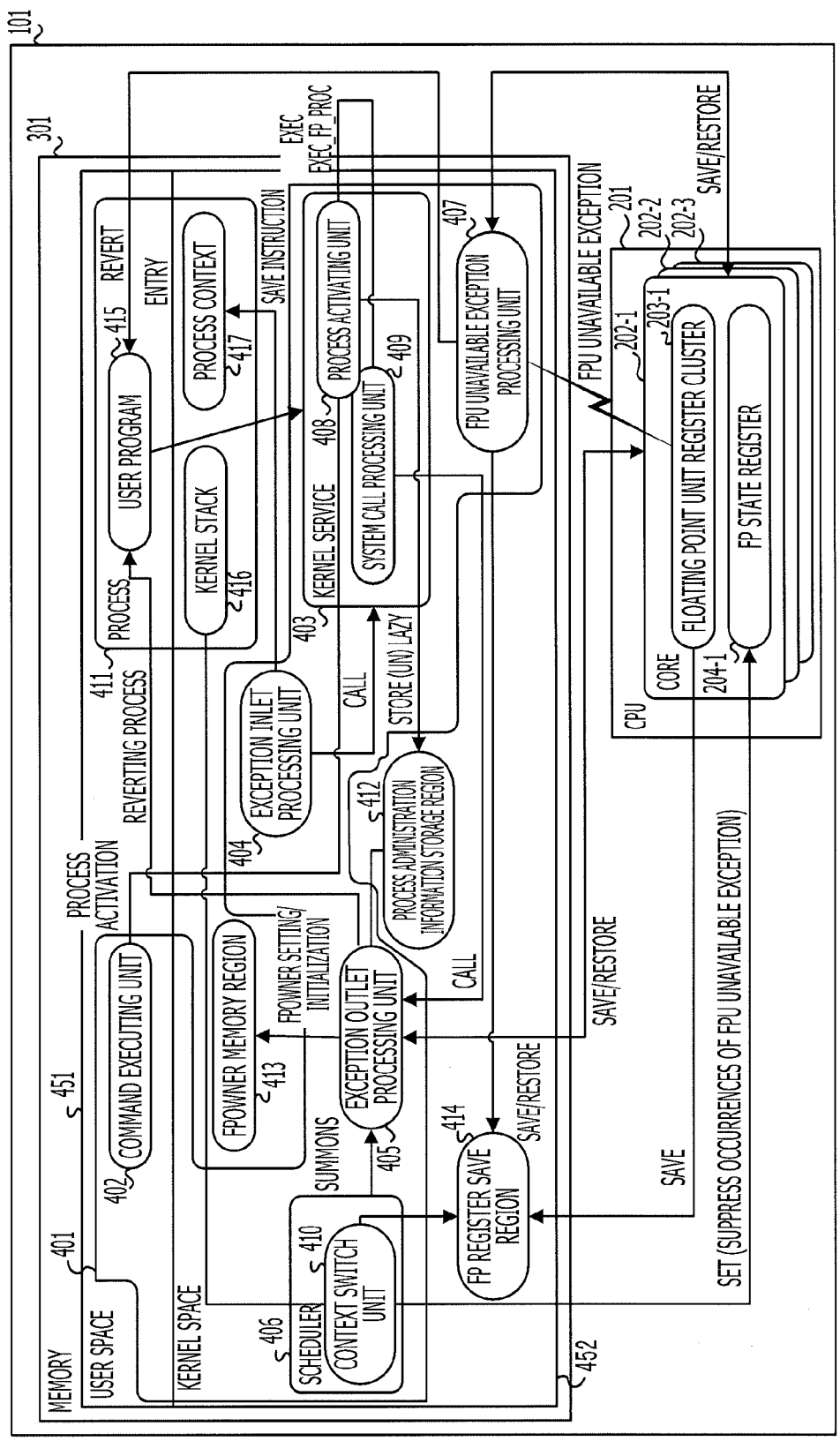
FIG. 1 illustrates a configuration of an information processor apparatus according to an embodiment.

FIG. 1 illustrates a configuration of an information processor apparatus according to an embodiment. An information processor apparatus (computer) 101 includes a central processing unit (CPU) 201 and a memory 301.

The CPU 201 is a processor that conducts various arithmetic processes. The CPU 201 has, for example, one or more cores 202-n (where n=1 to 3). The core 202-n includes a floating point register cluster 203-n made up of a plurality of floating point registers, and a floating point (FP) state register cluster 204-n. Moreover, the core 202-n is equipped with a computing section (not illustrated) that includes floating point units (FPU) that conduct floating point calculations, and general use registers (not illustrated).

Only core 202-1 is illustrated in detail in FIG. 1. The other cores besides core 202-1 also have floating point register clusters and FP state registers. The floating point registers making up the floating point register cluster 203 are registers that temporarily hold data when conducting floating point processing. In the present embodiment, the floating point register cluster is configured with, for example, sixty-four 64-bit length floating point registers. The FP state registers 204 store the states of available or unavailable FPUs and the usage condition of the floating point register cluster 203.

FIG. 2 illustrates an FP state register format. The FP state register 204 has a region that indicates bits that represent the availability or unavailability of the FPUs, and a region that indicates the floating point registers currently in use with a bit field. A bit 32 of the FP state register 204 indicates the availability or unavailability of the FPUs. For example, when the bit 32 is "0" the FPU is unavailable, and when the bit 32 is "1" the FPU is available.

Bit 0 to bit 7 of the FP state register 204 indicate the usage conditions of the floating point registers. The sixty-four floating point registers are allocated the numbers % f0 to % f63. For example, bit 0 indicates the usage conditions from floating point register % f0 to floating point register % f7. For example, bit 0 as "0" indicates that floating point registers % f0 to % f7 are not being used. Bit 0 as "1" indicates that some or all of the floating point registers % f0 to % f7 are being used.

The memory 301 is a main memory device that stores data and programs performed by the CPU 201. The memory 301 has an operating system 401, a process 411, a process administration information storage region 412, an FPowner memory region 413, and an FP register save region 414.

The operating system 401 includes a command executing unit 402, a kernel service 403, an exception inlet processing unit 404, an exception outlet processing unit 405, a scheduler 406, and an FPU unavailable exception processing unit 407.

The command executing unit 402 calls a function called a system call provided by the operating system 401. The kernel service 403 provides services to user programs. Specifically, the kernel service 403 provides services such as input/output to and from I/O devices, and memory acquisition.

The kernel service 403 includes a process activating unit 408 and a system call processing unit 409. The process activating unit 408 activates processes.

The system call processing unit 409 performs kernel services in response to called system calls. The exception inlet processing unit 404 conducts processing desired for moving to a kernel space 452 when using kernel services and the like due to exception processing generated by processes operated in a user space 451.

The exception outlet processing unit 405 conducts processing for reverting processes from the kernel space 452 to the user space 451 when the exception processing is completed, and for operating processes in the user space 451. Further, the exception outlet processing unit 405 has a function for setting and initializing the FPowner memory region 413, and for restoring values from the FP register save region 414 to the floating point register cluster 203.

The scheduler 406 is a component for conducting process switches. The scheduler 406 includes a context switch unit 410. The context switch unit 410 conducts process switching as a result of switching a kernel stack 416, and switches contexts following process switching.

The FPU unavailable exception processing unit 407 conducts processing required for moving processes from the user space 451 to the kernel space 401 when processes operating in a user space use kernel services.

The process 411 is an instance for the kernel to administer a program operated by a user. The process 411 includes a user program 415, the kernel stack 416, and a process context 417.

The user program 415 is an object file describing a process instruction operated in the user space 451. The kernel stack 416 is information that includes information about kernel calling relations and arguments, and process administration information.

The process context 417 is information for configuring a process. Specifically, the process context 417 includes process ID and used memory 301 address information, and instruction positions of processes currently being used. The process administration information storage region 412 has information that indicates the process type. The process administration information storage region 412 is created by a kernel when a process is generated, and is deleted when the process is dissolved.

FIG. 3 illustrates a process administration information storage region format. The process administration information storage region 412 includes program_class (process type memory region) that indicates the type of process (lazy or unlazy), and FPREGS that indicates a pointer to the FP register save region 414.

The program_class as "0" indicates that the process is a lazy process, and the program_class as "1" indicates that the process is an unlazy process. The program_class as another number besides "0" or "1" indicates that the process is a lazy process. The FPowner memory region 413 stores an identifier (owner information) of a process (FPowner) currently using the floating point register cluster 203.

FIG. 4 illustrates an FPowner memory region format. The FPowner memory region 413 stores fp_owner (owner information) that indicates an identifier of a process (FPowner) currently using the floating point register cluster 203. The FP register save region 414 is a secured region for saving a value of the floating point register cluster 203 for each process.

The memory 301 includes the user space 451 and the kernel space 452. The user space 451 is a virtual memory space required for allowing user programs to be operated by the operating system 401.

The kernel space 452 is a virtual memory space for operating system software of a kernel and a device driver and the like attached to the kernel. Generally, the kernel space 452 is protected from the user by software so that access from the program operating in the user space 451 is impossible. The command executing unit 402 and the user program 415 are provided in the user space 451.

On the other hand, the kernel service 403, the exception inlet processing unit 404, the exception outlet processing unit 405, the scheduler 406, the FPU unavailable exception processing unit 407, the process administration information storage region 412, the FPowner memory region 413, the FP register save region 414, the kernel stack 416, and the process context 417 are provided in the kernel space 452. Therefore, the kernel service 403, the exception inlet processing unit 404, the exception outlet processing unit 405, the scheduler 406, the FPU unavailable exception processing unit 407, the process administration information storage region 412, the FPowner memory region 413, the FP register save region 414, the kernel stack 416, and the process context 417 provided in the kernel space 452 cannot be accessed by the command executing unit 402 or the user program 415.

A method to activate programs according to the embodiment will be described first. A method to activate a program in the information processor apparatus 101 according to the embodiment includes the two following systems. (1) One system uses an existing program activation system call (exec). The program activation system call exec conforms to the Portable Operating System Interface (POSIX).

(2) Another system uses a new program activation system call (exec_fp_proc), and the user specifies lazy or unlazy when the program is activated. The exec_fp_proc is a newly established system call in the present embodiment.

In the present embodiment, a new program activation system call is illustratively defined as exec_fp_proc, but other system call names may be used. For example, "exec_fp_proc (const char *command_path, const char *argv☐, LAZY)" may be written in the source file when the process type is specified as lazy in C-language.

Furthermore, "exec_fp_proc(const char *command_path, const char *argv☐, UNLAZY)" may be written in the source file when the process type is specified as unlazy in C-language. "*command_path" is a file path to an execution file, and "*argv☐" is a pointer to an argument array to be transferred to an activated process. Furthermore, "lazy" and "unlazy" indicate process types and are called process specifying arguments.

Figure 5:
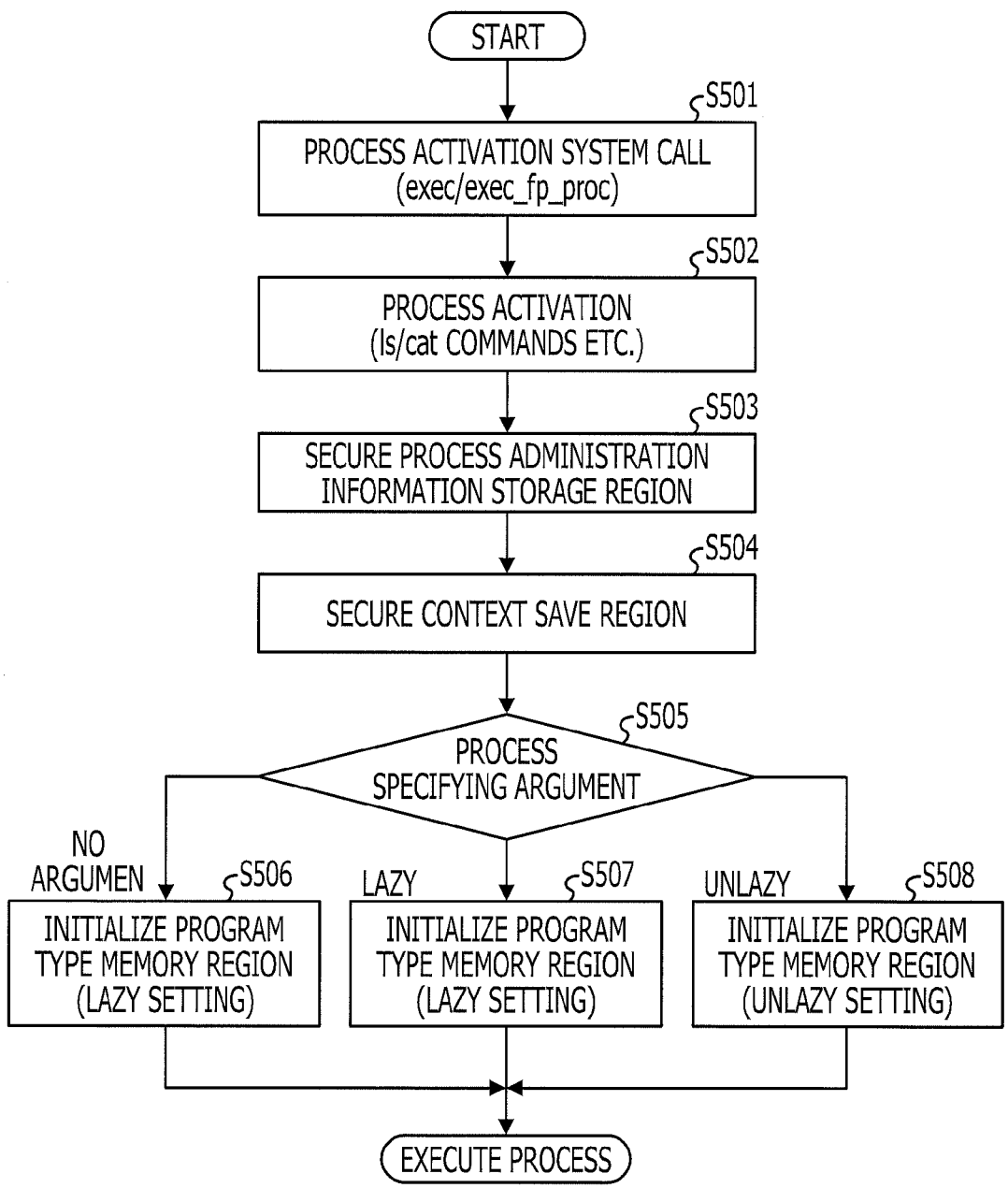
FIG. 5 is a flow chart of process activation procedures according to the embodiment.

FIG. 5 is a flow chart of process activation procedures according to the embodiment. The following describes the activation of a process using the system call "exec_fp_proc".

First, the command executing unit 402 calls the system call (exec_fp_proc) (S501). The process activating unit 408 activates a process ("ls" (list segments) and "cat" (concatenate) commands and the like) using exec_fp_proc (S502).

The process activating unit 408 secures the process administration information storage region 412 (S503) and further secures a region (context save region) for saving the process context 417 (S504).

Next, the process activating unit 408 determines the type of process specifying argument. If the process specifying argument is "lazy" and there is no argument, the process activating unit 408 initializes a program type memory region of the process administration information storage region 412 and sets the region as "lazy" (S506 or S507). On the other hand, if the process specifying argument is "unlazy," the process activating unit 408 initializes a program type memory region of the process administration information storage region 412 and sets the region as "unlazy" (S508). In subsequent procedures, the information necessary for the process is set and the process can be executed.

Figure 6A:
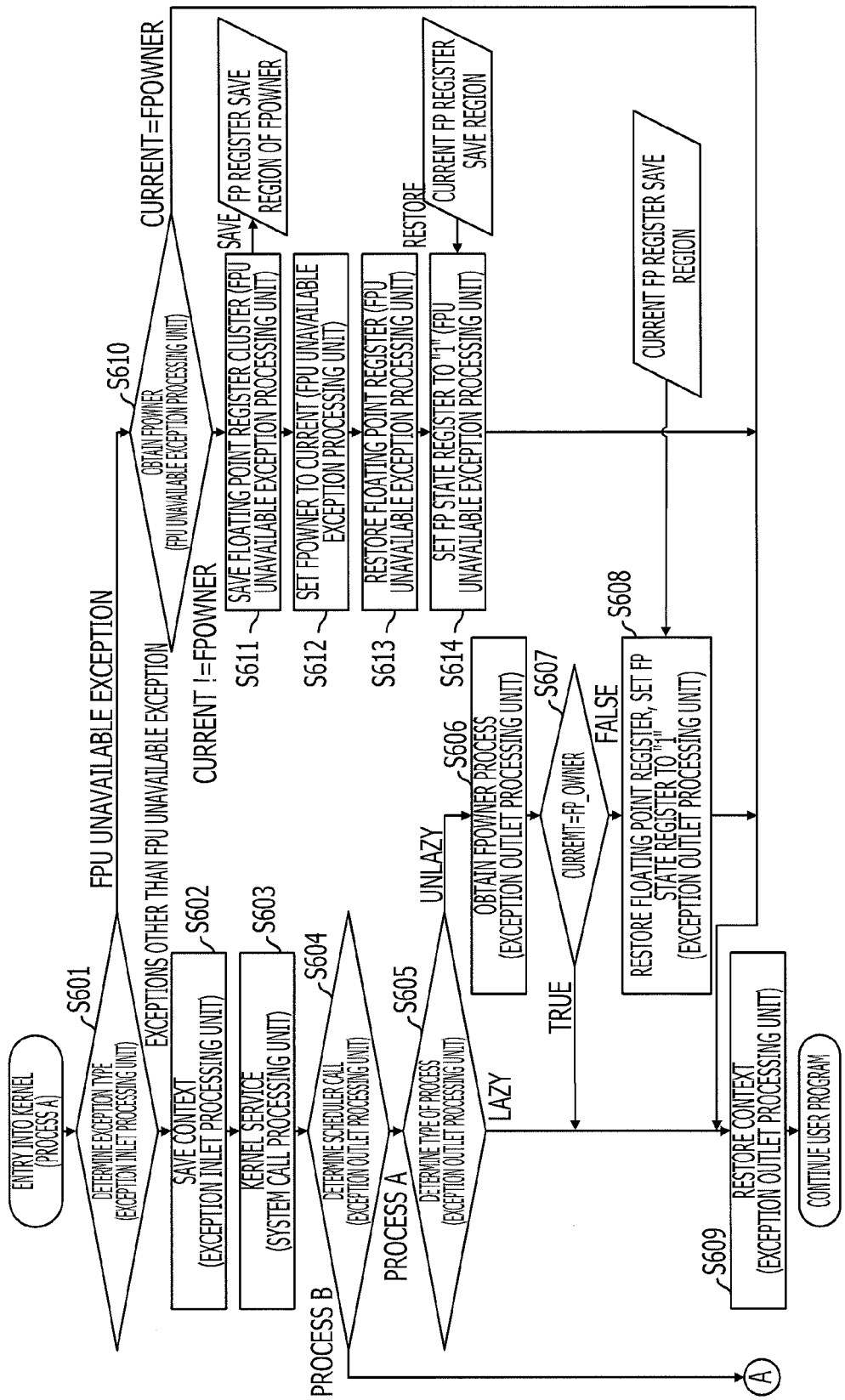
FIG. 6A is a flow chart of a context switch according to the embodiment.
Figure 6B:
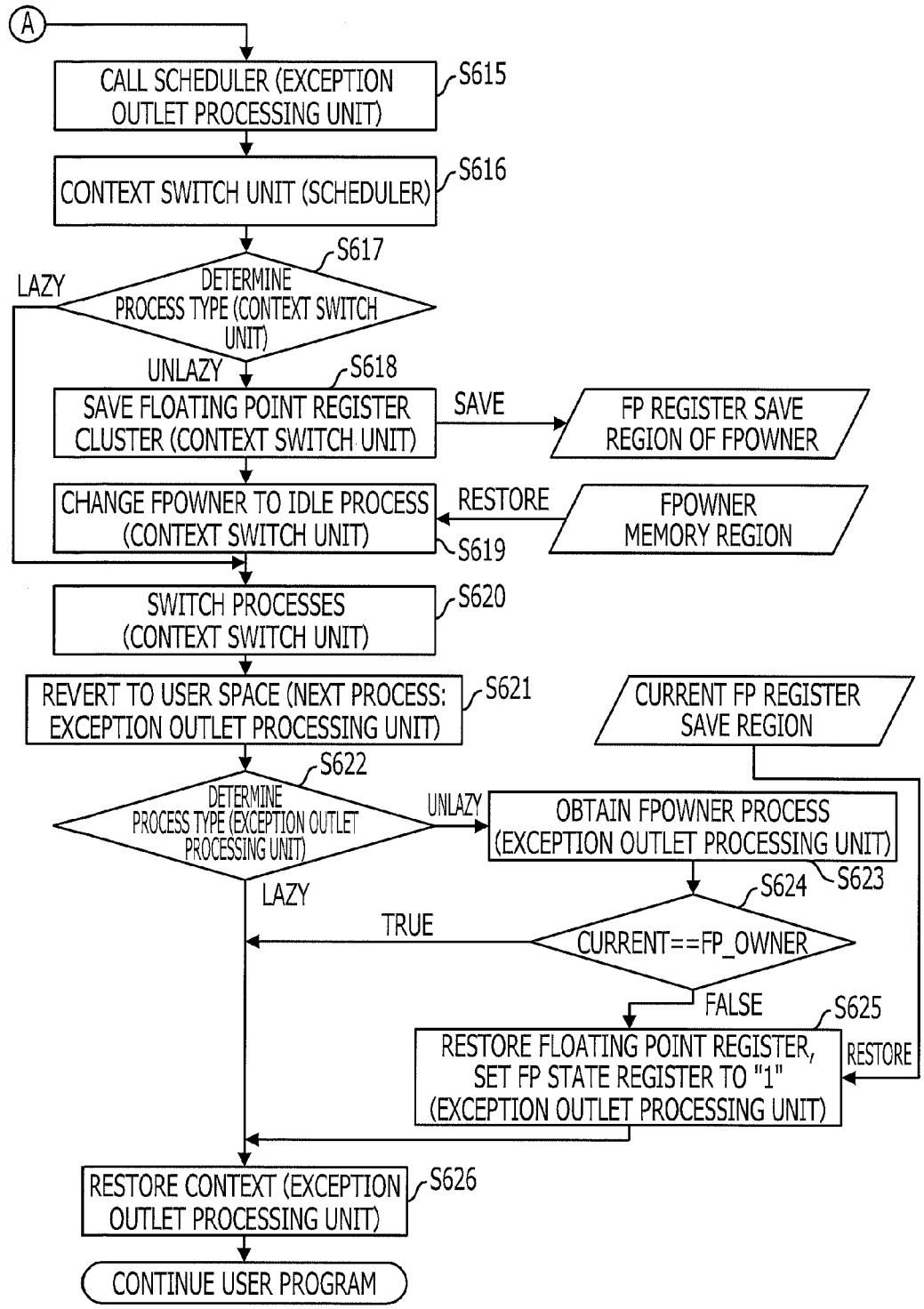
FIG. 6B is a flow chart of a context switch according to the embodiment.

FIGS. 6A and 6B are flow charts illustrating a process switch according to the embodiment. The process A is conducted first. In S601, the exception inlet processing unit 404 determines whether a generated exception is an FPU unavailable exception for which FPUs are unavailable. If the generated exception is an FPU unavailable exception (when FPUs cannot be used), the control advances to S610. If the generated exception is not an FPU unavailable exception (when FPUs can be used), the control advances to S602.

An FPU unavailable exception is only generated when the current process is "lazy". In S602, the exception inlet processing unit 404 saves a context other than the FPU register of the current process, in the process context 417.

In S603, the system call processing unit 409 conducts a kernel service. In S604, the exception outlet processing unit 405 conducts a scheduler call determination. More specifically, the exception outlet processing unit 405 determines whether the process to be executed after the kernel service is the same as the process (process A) executed before the kernel service or a different process (process B).

If the process to be executed after the kernel service is process A, the control advances to S605. If the process to be executed after the kernel service is process B, the control advances to S615.

In S605, the exception outlet processing unit 405 refers to the process administration information storage region 412 to determine whether process A is lazy or unlazy. If the process A is lazy, the control advances to S609. If the process A is unlazy, the control advances to S606.

In S606, the exception outlet processing unit 405 refers to the FPowner memory region 413 to obtain a value of the identifier (owner information) of the current FPowner. In S607, the exception outlet processing unit 405 determines whether the current process (process A) is the same as the value of current FPowner identifier. If the current process is the same as the FPowner identifier value, the control advances to S609, but if different, the control advances to S608.

In S608, the exception outlet processing unit 405 reads a register value from the FP register save region 414 of the current process and restores the register to the floating point register cluster 203. Moreover, the exception outlet processing unit 405 sets the bit 32 of the FP state registers 204 to "1".

In S609, the exception outlet processing unit 405 restores the process A context. The context restored by the exception outlet processing unit 405 is a context (for example, a general use register value and the like) other than the value of a register included in the floating point register cluster 203.

In S610, the FPU unavailable exception processing unit 407 refers to the FPowner memory region 413 to obtain a value of the identifier of the current FPowner. Next, the FPU unavailable exception processing unit 407 determines whether the value of the identifier (owner information) of the current FPowner is the same as the current process (process A). If the current process is the same as the FPowner identifier value, the control advances to S609, but if different, the control advances to S611.

In S611, the FPU unavailable exception processing unit 407 saves the register value of the floating point register cluster 203 in the FP register save region 414 corresponding to the FPowner identifier (owner information).

In S612, the FPU unavailable exception processing unit 407 sets the value of the FPowner identifier (owner information) to the current process (process A). In S613, the FPU unavailable exception processing unit 407 reads a register value from the FP register save region 414 of the current process and restores the register value to the floating point register cluster 203. In S614, the FPU unavailable exception processing unit 407 sets the bit 32 of the FP state registers 204 to "1". Then the control advances to S609.

In S615, the exception outlet processing unit 405 calls the scheduler 406. In S616, the scheduler 406 selects the next process to execute. In the present embodiment, the process B is selected. In S617, the context switch unit 410 refers to the process administration information storage region 412 to determine the type of the process B. If the process B is "lazy," the control advances to S620. If the process B is "unlazy," the control advances to S618.

In S618, the context switch unit 410 saves the register value of the floating point register cluster 203 in the FP register save region 414 corresponding to the FPowner identifier (owner information).

In S619, the context switch unit 410 sets the FPowner to an idle process. An idle process is a process that operates in an idle state without using CPU computing resources while waiting for I/O completion and the like.

In S620, the context switch unit 410 switches the current process to the process B. More specifically, the context switch unit 410 switches the kernel stack 416 to the kernel stack of the process B.

In S621, the exception outlet processing unit 405 reverts the process B from the kernel space 452 to the user space 451. In S622, the exception outlet processing unit 405 refers to the process administration information storage region 412 to determine whether process B is lazy or unlazy. If process B is "lazy," the control advances to S626. If the process B is "unlazy," the control advances to S623.

In S623, the exception outlet processing unit 405 refers to the FPowner memory region 413 to obtain the value of the identifier (owner information) of the current FPowner. In S624, the exception outlet processing unit 405 determines whether the value of the identifier (owner information) of the current FPowner is the same as the current process (process B). If the current process is the same as the current FPowner identifier value, the control advances to S626, but if different, the control advances to S625.

In S625, the exception outlet processing unit 405 reads the register value from the FP register save region 414 of the current process and restores the register value to the floating point register cluster 203. Moreover, the exception outlet processing unit 405 sets the bit 32 of an FP state registers 204 to "1".

In S626, the exception outlet processing unit 405 restores the process B context. The context restored by the exception outlet processing unit 405 is a context (for example, a general use register) other than the register of the floating point register cluster 203.

According to the operating system of the embodiment, when the next process to be executed is a lazy process, the register value of the floating point register cluster is not saved. As a result, the number of occurrences of context switches accompanying process switching is reduced by not saving the register value of the floating point register cluster when executing a lazy process that has a low possibility of using the floating point register cluster, resulting in a reduction in costs due to operating system overhead and the like based on context switch occurrences.

According to the operating system of the embodiment, when the next process to be executed is an unlazy process, the register value of the floating point register cluster is saved. As a result, an FPU unavailable exception in which FPUs cannot be used is not generated so that the reduction of throughput due to the generation of exceptions can be prevented when executing unlazy processes with a high possibility of using the floating point register cluster.

According to the operating system of the embodiment, context switches can be conducted effectively by determining whether saving or restoration of the floating point register cluster is executed in response to the type of process to be executed. As a result, total throughput of the information processor apparatus is improved.

Figure 7:
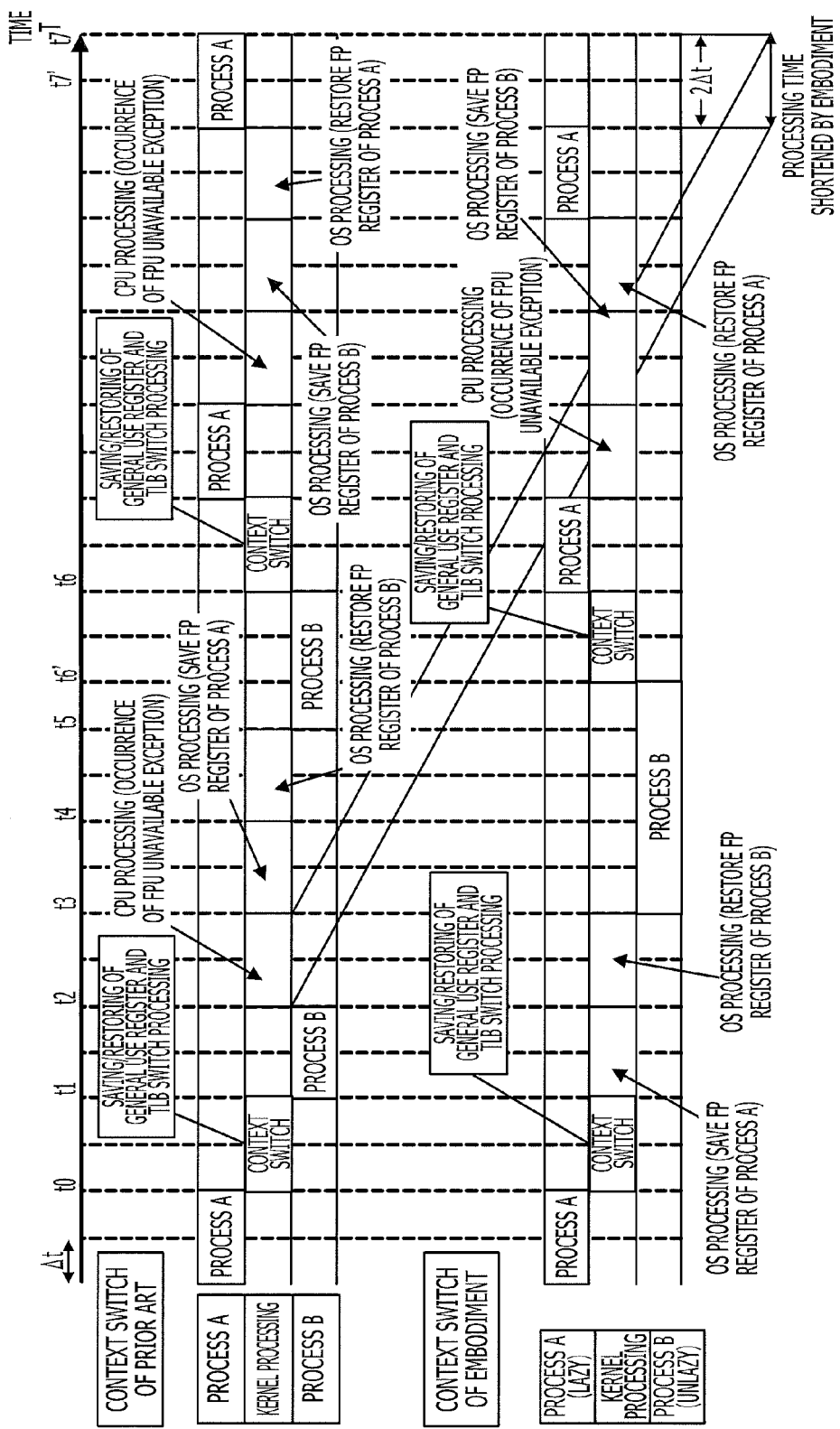
FIG. 7 is a time chart of a context switch according to the embodiment and prior art.

FIG. 7 is a time chart of a context switch according to the embodiment and prior art. The upper part of FIG. 7 illustrates processing based on a context switch of the prior art, while the bottom part illustrates processing based on a context switch according to the present embodiment.

In FIG. 7, process A is a lazy process and process B is an unlazy process. However, the prior art does not differentiate a process as a lazy process or an unlazy process.

Each interval between the scale levels is $\Delta t$ in FIG. 7. As illustrated in FIG. 7, first the process A is executed and then the process A is switched to the process B. The process B is allocated to the CPU in $5*\Delta t$ time divisions, and then the process A is allocated to the CPU in $4*\Delta t$ time divisions.

In the context switch of the prior art, a context switch including saving and restoring of general use registers and TLB switch processing is conducted at t0. The process B is executed at t1 and an FPU unavailable exception occurs at t2. Since the FPU unavailable exception occurs, the process A FP register is saved at t3, the process B FP register is restored at t4, and the process B is executed at t5. Since the process B is executed within a total of $5*\Delta t$ time divisions from the context switch at t0 to t6, a context switch is conducted and processing is switched to the process A. Next, the process A is executed, an FPU unavailable exception occurs, the process A FP register is saved and the process B FP register is restored, and the process A is executed. After the context switch at t0, the process B is executed in $5*\Delta t$ time divisions and the process A is executed in $4*\Delta t$ time divisions by t7.

In the context switch of the embodiment, a context switch including saving and restoring of general use registers and TLB switch processing is conducted at t0. The process A FP register is saved at t1, the process B FP register is restored at t2, and the process B is executed at t3. Since the process B is executed within a total of $5*\Delta t$ time divisions from the context switch at t0 to t6', a context switch is conducted and processing is switched to the process A. Next, the process A is executed, an FPU unavailable exception occurs, the process A FP register is saved and the process B register is restored, and the process A is executed. After the context switch at t0, the process B is executed in $5*\Delta t$ time divisions and the process A is executed in $4*\Delta t$ time divisions by t7'.

In comparing the context switch of the prior art with the context switch of the present embodiment in FIG. 7, if the process A and the process B are executed in the same amount of time, the processing of the context switch of the present embodiment is completed $2\Delta t$ time divisions faster.

According to the present embodiment, conventionally the CPU time allocated to the drive time of the exception handler can be allocated to a job since a floating point unavailable exception for a context restoration of a process that uses multiple floating point registers is rendered unnecessary as illustrated in FIG. 7. Therefore, the information processor apparatus throughput is improved.

In the above embodiment, a floating point register is used as an example of a processor (CPU) resource, for the present invention. However, the present invention is not limited as such and any type of processor resource (e.g., other types of CPU registers) may be applicable. For example, a CPU general use register may be applied to the present invention and saving and restoring a register value of a general use register may be conducted.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions, for example, computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The information processing apparatus (computer) 101 can comprise a controller (CPU) (e.g., a hardware logic circuitry based computer processor that processes or executes instructions, namely software/program), computer readable media (e.g., memory 301), transmission communication interface (network interface), and/or an output device, for example, a display device, and which can be in communication among each other through one or more data communication buses. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A computer-readable, non-transitory medium storing a program to control an information processing apparatus having a processor that uses a register and a memory coupled to the processor, to execute a procedure comprising:
    reading, from the memory, register usage attribute information of a next process, the register usage attribute information of the next process indicating a usage frequency of a floating point register usable by the next process, when the processor switches from a current process being executed;
    saving, to the memory, a value of the floating point register usable by the next process when the usage frequency of the floating point register by the next process indicated by the register usage attribute information of the next process is larger than a frequency threshold;
    reading, from the memory, owner information indicating a process which is using the floating point register usable by the next process when the usage frequency of the floating point register by the next process indicated by the register usage attribute information of the next process is larger than the frequency threshold and restoring the value of the floating point register saved in the memory to the floating point register when the owner information indicates a process other than the next process with the usage frequency of the floating point register larger than the frequency threshold; and
    restoring a general use register of the next process when the owner information indicates the next process with the usage frequency of the floating point register larger than the frequency threshold or when the usage frequency of the floating point register by the next process indicated by the register usage attribute information of the next process is equal to or below the frequency threshold.

2. The computer-readable, non-transitory medium according to claim 1, wherein the procedure comprises:
    storing previously set register usage attribute information in the memory when a program including the process currently being executed by the processor is activated.

3. The computer-readable, non-transitory medium according to claim 1, wherein the owner information of the floating point register is set to an idle process, when a process using the floating point register does not exist.

4. The computer-readable, non-transitory medium according to claim 1, wherein the restoring of the value of the floating point register saved in the memory to the floating point register includes:
    comparing the current process to the next process, and
    restoring the value of the floating point register saved in the memory to the floating point register when the owner information indicates the current process is different from the next process with the usage frequency of the floating point register larger than the frequency threshold, based on the comparing.

5. A method to control an information processing apparatus including a processor having a register and executing processes, and a memory coupled to the processor, the method comprising:
    causing execution by the information processing apparatus of:
    reading register usage attribute information of a next process to be executed by the processor, the register usage attribute information of the next process indicating a usage frequency of a floating point register usable by the next process, when the processor switches from a current process being executed;
    saving, to the memory, a value of the floating point register usable by the next process when the usage frequency of the floating point register by the next process as indicated by the register usage attribute information of the next process is larger than a frequency threshold;
    reading owner information indicating a process which is using the floating point register usable by the next process when the usage frequency of the floating point register by the next process as indicated by the register usage attribute information of the next process is larger than the frequency threshold and restoring the value of the floating point register saved in the memory to the floating point register when the owner information indicates a process to be executed other than the next process with the usage frequency of the floating point register larger than the frequency threshold; and
    restoring a general use register of the next process when the owner information indicates the next process with the usage frequency of the floating point register larger than the frequency threshold or when the usage frequency of the floating point register by the next process indicated by the register usage attribute information of the next process is equal to or below the frequency threshold.

6. The method according to claim 5, comprising:
    storing previously set register usage attribute information in the memory when a program including the process currently being executed by the processor is activated.

7. The method according to claim 5, wherein the owner information of the floating point register is set to an idle process, when a process using the floating point register does not exist.

8. The method of the information processing apparatus according to claim 5, wherein the restoring of the value of the floating point register saved in the memory to the floating point register includes:
    comparing the current process to the next process, and
    restoring the value of the floating point register saved in the memory to the floating point register when the owner information indicates the current process is different than the next process with the usage frequency of the floating point register larger than the frequency threshold, based on the comparing.

9. An information processing apparatus comprising:
a processor that executes processes;
a memory to store register usage attribute information indicating frequency usages of a plurality of registers, and owner information indicating a current process using the plurality of registers; and
a register controller that:
reads the register usage attribute information of a next process to be executed by the processor, the register usage attribute information of the next process indicating a usage frequency of a floating point register usable by the next process, when a current process being executed is switched,
saves, to the memory, a value of the floating point register to be used by the next process when the usage frequency of the floating point register by the next process indicated by the attribute information is larger than a certain frequency,
reads, from the memory, owner information indicating a process that is using the floating point register usable by the next process when the usage frequency of the floating point register by the next process indicated by the register usage attribute information of the next process is larger than the frequency threshold and restores the value of the floating point register saved in the memory to the floating point register when the owner information indicates a process other than the next process with the usage frequency of the floating point register larger than the frequency threshold; and
restores a general use register of the next process when the owner information indicates the next process with the usage frequency of the floating point register larger than the frequency threshold or when the usage frequency of the floating point register by the next process indicated by the register usage attribute information of the next process is equal to or below the frequency threshold.

10. The information processing apparatus according to claim 9 wherein the register controller further stores previously set register usage attribute information in the memory when a program including the process currently being executed by the processor is activated.

11. The information processing apparatus according to claim 9 wherein the owner information is set to an idle process, when a process using the floating point register does not exist.

12. The information processing apparatus according to claim 9, wherein the register controller restores the value of the floating point register saved in the memory to the floating point register by:
compares the current process to the next process, and
restores the value of the floating point register saved in the memory to the floating point register when the owner information indicates the current process is different than the next process with the usage frequency of the floating point register larger than the frequency threshold, based on the comparing.

* * * * *